(12) United States Patent
Kwon et al.

(10) Patent No.: US 7,809,099 B2
(45) Date of Patent: Oct. 5, 2010

(54) DIRECT VESSEL INJECTION (DVI) NOZZLE FOR MINIMUM EMERGENCY CORE COOLING (ECC) WATER BYPASS

(75) Inventors: Tae-Soon Kwon, Daejeon (KR); Chul-Hwa Song, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 156 days.

(21) Appl. No.: 10/985,862

(22) Filed: Nov. 10, 2004

(65) Prior Publication Data

US 2010/0226470 A1    Sep. 9, 2010

(30) Foreign Application Priority Data

Sep. 24, 2004    (KR)    ............... 10-2004-0077449

(51) Int. Cl.
    *G21C 15/18*    (2006.01)
(52) U.S. Cl. .................... 376/282; 376/352; 376/361; 376/396
(58) Field of Classification Search ............ 376/352, 376/282, 454, 400, 289, 361, 396; 176/38, 176/61, 65, 37
See application file for complete search history.

(56) References Cited

U.S. PATENT DOCUMENTS

| | | | | |
|---|---|---|---|---|
| 3,956,063 A | * | 5/1976 | Johnson et al. | ............ 376/282 |
| 4,064,001 A | * | 12/1977 | Duncan | ............ 376/283 |
| 4,078,966 A | * | 3/1978 | Verdeau | ............ 376/282 |
| 4,082,608 A | | 4/1978 | Curet | |
| 4,187,147 A | * | 2/1980 | Braun et al. | ............ 376/282 |

(Continued)

FOREIGN PATENT DOCUMENTS

KR    10-2003-0022109    *    4/2003

OTHER PUBLICATIONS

Nuclear Power Engineering Committee of the IEEE Power Engineering Society. "IEEE Standard Criteria for Safety Systems for Nuclear Power Generating Systems." Approved Jul. 1, 1998. front matter and pp. 1-31.*

(Continued)

*Primary Examiner*—Johannes P Mondt
(74) *Attorney, Agent, or Firm*—Bachman & LaPointe, P.C.

(57) ABSTRACT

A direct vessel injection (DVI) nozzle for minimum emergency core coolant (ECC) bypass is disclosed. The DVI nozzle is used in a pressurized light water reactor (PLWR) having a reactor vessel with a reactor coolant system in which a coolant flows into the reactor vessel through a cold leg and passes through a reactor core prior to being discharged to the outside of the reactor vessel through a hot leg. The DVI nozzle, provided to directly inject ECC into the reactor vessel to cool the reactor core during a break in the reactor coolant system, such as a cold leg break (CLB) that may occur in the PLWR, is placed on the reactor vessel at a position horizontally offset from the central axis of the hot leg at an angle of 10° to 30° and is involved within a region defined above the central axis of the hot leg by a distance of 1.5 times the sum of diameters of the hot leg and the DVI nozzle. Thus, the DVI nozzle efficiently injects ECC, and remarkably reduces the direct ECC bypass fraction to a broken cold leg and minimizes the amount of direct ECC bypass.

2 Claims, 6 Drawing Sheets

U.S. PATENT DOCUMENTS

| | | | | |
|---|---|---|---|---|
| 4,784,824 | A | * | 11/1988 | Gandrille et al. ............ 376/282 |
| 4,842,813 | A | * | 6/1989 | Desfontaines et al. ....... 376/353 |
| 4,859,401 | A | * | 8/1989 | Murase et al. .............. 376/282 |
| 5,000,907 | A | * | 3/1991 | Chevereau et al. .......... 376/282 |
| 5,135,708 | A | * | 8/1992 | Carlton et al. .............. 376/282 |
| 5,178,821 | A | * | 1/1993 | Gluntz ....................... 376/282 |
| 5,377,242 | A | * | 12/1994 | Carlton et al. .............. 376/282 |
| 6,928,133 | B2 | * | 8/2005 | Kwon et al. ................. 376/282 |
| 2004/0218709 | A1 | * | 11/2004 | Kwon et al. ................. 376/282 |

OTHER PUBLICATIONS

Mitra et al. "Common-Mode Failures in Redundant VLSI Systems: A Survey." IEEE Transactions on Reliability. vol. 49, No. 3, Sep. 2000. pp. 285-295.*

Jianping et al. Safety Systems and Safety Analysis of the Qinshan Phase III CANDU Nuclear Power Plant. <http://canteach.candu.org/library/20054408.pdf> downloaded Feb. 13, 2007.*

Yoon et al. "Direct Vessel Injection Flow into Reactor Downcomer: Experiment and Analysis", www.engr.ncsu.edu/SMiRT-16/1785.pdf Jan. 6, 2004.*

"Nuclear Energy in California", by the Nuclear Energy Commission (last updated 2008).*

Yun et al, "Scaling for the ECC bypass phenomena during the LBLOCA reflood phase", Nuclear Engineering & Design 231 (2003), pp. 315-325.*

Kwon et al, "Effect of the Yaw Injection Angle on the ECC bypass in comparison with the horizontal DVI", Nuclear Engineering & design 225 (2003), pp. 295-304.*

* cited by examiner

PRIOR ART

DIRECT VESSEL INJECTION (DVI) NOZZLE FOR MINIMUM EMERGENCY CORE COOLING (ECC) WATER BYPASS

BACKGROUND OF THE INVENTION

1. Field of the Invention

The present invention relates, in general, to direct vessel injection (DVI) nozzles for minimum emergency core cooling (ECC) water bypass and, more particularly, to a DVI nozzle which efficiently injects ECC into a reactor vessel of a pressurized light water reactor (PLWR) to cool a reactor core during a cold leg break (CLB) that may occur in a reactor coolant system of the PLWR, thus remarkably reducing the direct ECC bypass fraction to a broken cold leg and minimizing the amount of direct ECC bypass.

2. Description of the Related Art

Generally, in a nuclear reactor to generate electric energy using a fission reaction, pressurized light water is used as a reactor coolant for carrying the thermal energy generated from the reaction of nuclear fuel. A pressurized light water reactor (PLWR), must be maintained core cooling state during a loss-of-coolant accident to remove the decay heat of core.

In the event of coolant leakage from the reactor coolant system of a PLWR, the reactor core overheats, sometimes causing breakage of the PLWR. In an effort to protect the reactor core against coolant leakage from such a PLWR, emergency core coolant (ECC) is supplied from an outside ECC source to the reactor vessel. In the related art, the ECC is typically injected into the reactor vessel in one of two injection modes: a cold leg injection (CLI) mode and a direct vessel injection (DVI) mode.

Korean Patent Registration No. 10-0319068 discloses a cylindrical reactor vessel 100 having a reactor core 101 therein to generate thermal energy through a fission reaction, as shown in FIG. 1 of the accompanying drawings. A core support 104 is placed in the reactor vessel 100 to support the reactor core 101 in the vessel 100, with a downcomer 105 defined between the reactor vessel 100 and the core support 104. A coolant is introduced into the vessel 100 through cold legs 102 and flows downwards through the downcomer 105 to reach a lower chamber 107 of the vessel 100, and flows to the reactor core 101 to absorb thermal energy from the reactor core 101 and is, thereafter, discharged to the outside of the vessel 100 through hot legs 103.

In the above-mentioned conventional nuclear reactor, direct vessel injection (DVI) nozzles 106 are provided on the vessel 100 at positions adjacent to the cold legs 102 so that the DVI nozzles 106 inject ECC into the vessel 100 to supply ECC to the reactor core 101 in the event of a cold leg break (CLB). Furthermore, safe injection ducts 108 extend from positions around the DVI nozzles 106 to positions around the lower chamber 107 in an effort to prevent injected ECC from being swept into a broken cold leg 102 during a cold leg break (CLB).

However, in the conventional reactor vessel 100 having the DVI nozzles 106 provided at positions adjacent to the cold legs 102, ECC to cool the reactor core 101 during a cold leg break (CLB) may be undesirably swept into a broken cold leg 102 to cause ECC loss. The results caused by the sweep-out of ECC into the broken cold leg 102 are illustrated in FIG. 2. FIG. 2 is a graph illustrating the results of MARS (RELAP5/Mod3 1D) code analysis executed by a computer when ECC provided to protect the reactor core 101 against a cold leg break (CLB) is injected into the vessel 100 in a conventional direct vessel injection (DVI) mode using the DVI nozzles 106 provided on the vessel 100 at positions horizontally offset from the cold legs 102 at 15° angles relative to the cold legs 102 in opposite directions. To calculate a core fuel cladding temperature, the reactor core 101 is divided into twenty vertically arranged volumes and the core fuel cladding temperature is calculated in individual volumes. The twenty volumes are respectively designated by the numbers, Node1, Node2, Node3, Node4, Node5, Node6, . . . Node20, sequentially in order from the bottom to the top of the reactor core 101 so that Node20 designates the top of the reactor core 101. when a cold leg break (CLB) occurs in the reactor coolant system of the vessel 100, some sections of the reactor core 101, namely Node10 to Node15, located within a region from the middle of the reactor core 101 to ⅔ of the way to the top of the core 101, may exceedingly overheat. Variations in the temperatures of four sections of the core 101, which are Node10, Node12, Node14 and Node15, during a cold leg break (CLB) are shown in the graph of FIG. 2. The graph of FIG. 2 shows that the core fuel cladding temperatures become stabilized when two hundred seconds pass after ECC is injected into the vessel 100 to protect the core 101 against the CLB. However, as the DVI nozzles 106 are provided at positions adjacent to the cold legs 102, the core fuel cladding temperatures rapidly increase after four hundred seconds pass after the injection of ECC into the vessel 100. This is so-called "core reheating" that cannot be allowed in the event of such a CLB of a reactor in which all the fuel rods are installed. The core reheating is caused by ECC which does not sufficiently cool the core 101 during the CLB. In other words, the core reheating is caused by an increase in the amount of direct ECC bypass fraction to a broken cold leg 102. Due to the increase in the amount of direct ECC bypass fraction to the broken cold leg 102, the amount of ECC flowing from the downcomer 105 to the reactor core 101 is reduced, while the amount of ECC swept into the broken cold leg 102 increases. When the sweep-out of ECC into the broken cold leg 102 continues, the temperature of the core 101 rapidly increases to cause reactor breakage.

SUMMARY OF THE INVENTION

Accordingly, the present invention has been made keeping in mind the above problems occurring in the related art, and an object of the present invention is to provide a direct vessel injection (DVI) nozzle which efficiently injects emergency core coolant (ECC), provided to protect a reactor core against a break in a reactor coolant system, such as a cold leg break (CLB) that may occur in a pressurized light water reactor (PLWR), thus remarkably reducing the direct ECC bypass fraction to a broken cold leg and minimizing the amount of direct ECC bypass.

In order to achieve the above object, the present invention provides a DVI nozzle for minimum ECC bypass used in a PLWR having a reactor vessel with a reactor coolant system in which a coolant flows into the reactor vessel through a cold leg and passes through a reactor core prior to being discharged to the outside of the reactor vessel through a hot leg, and the DVI nozzle provided on the reactor vessel to directly inject ECC into the reactor vessel, which is placed on the reactor vessel at a position horizontally offset from a central axis of the hot leg at an angle of 10° to 30° and is involved within a region defined above the central axis of the hot leg in a vertical direction of the reactor vessel by a distance of 1.5 times the sum of diameters of the hot leg and the DVI nozzle.

Preferably, the DVI nozzle for minimum ECC bypass is placed at a position horizontally offset from the central axis of the hot leg at an angle of 15° and is involved within a region defined between distances of 1 meter and 2 meters above the central axis of the hot leg in the vertical direction of the reactor vessel.

BRIEF DESCRIPTION OF THE DRAWINGS

The above and other objects, features and other advantages of the present invention will be more clearly understood from the following detailed description when taken in conjunction with the accompanying drawings, in which:

FIG. 5b is a 180° symmetry development view of the region HL×DD of the reactor vessel of FIG. 5a;

FIG. 7b is a ¼ symmetry development view of the region C-C of the reactor vessel of FIG. 7a;

DETAILED DESCRIPTION OF THE INVENTION

Figure 1:
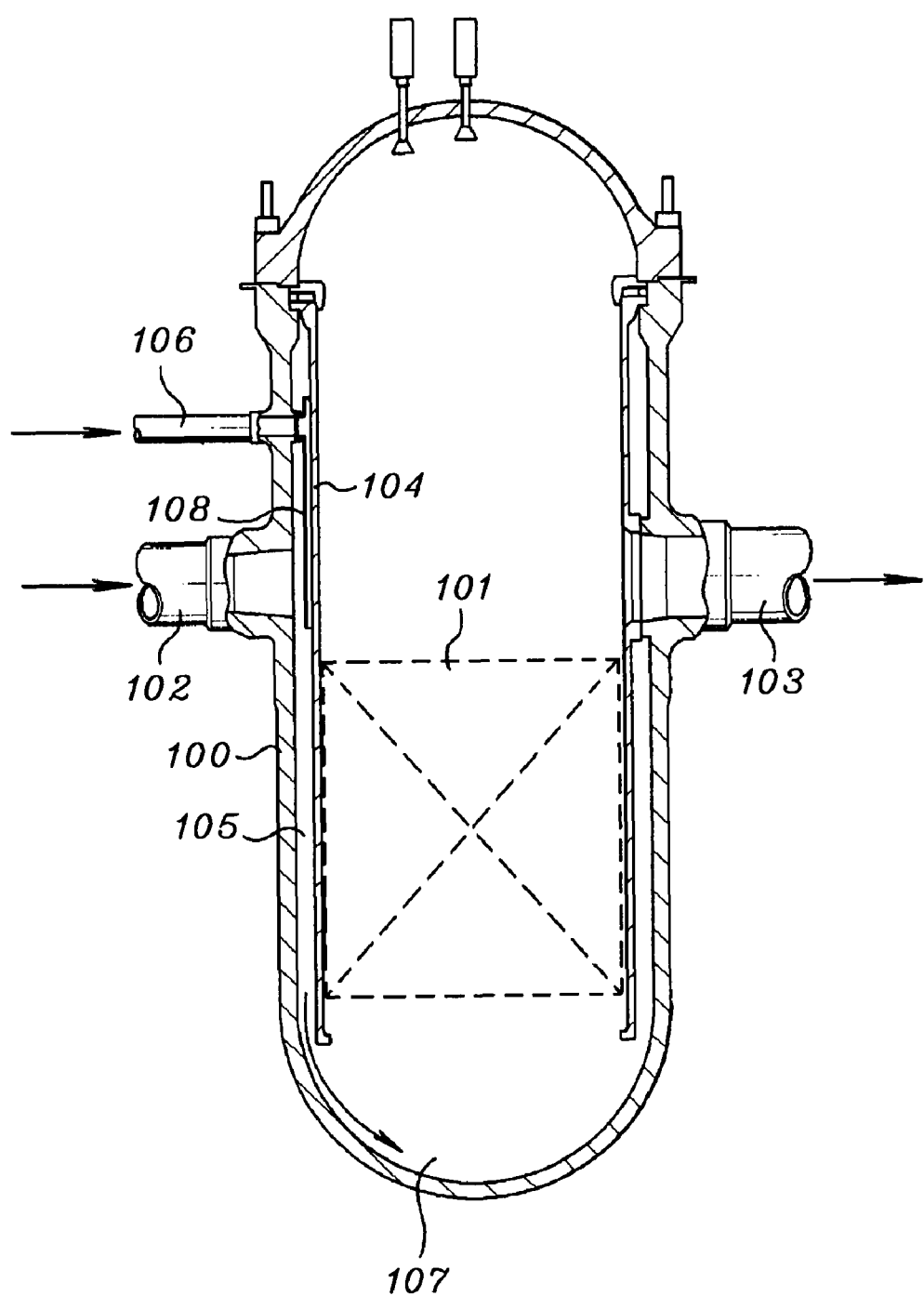
FIG. 1 is a longitudinal sectional view of a reactor vessel of a conventional pressurized light water reactor (PLWR)
Figure 2:
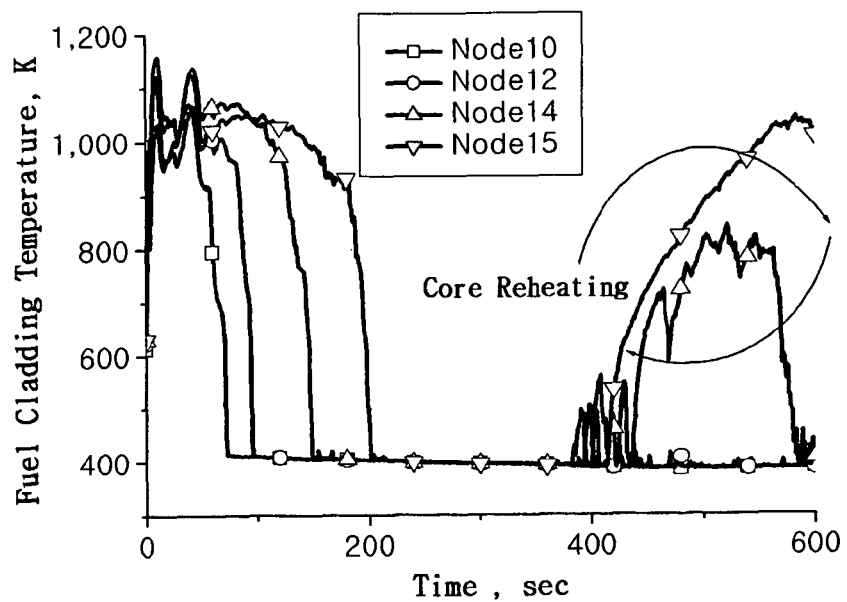
FIG. 2 is a graph illustrating the results of MARS (RELAP5/Mod3 1D) code analysis executed by a computer during conventional direct vessel injection (DVI) of ECC provided to protect a reactor core against a cold leg break (CLB) using DVI nozzles provided on the reactor vessel at positions horizontally offset from cold legs at 15° angles relative to the cold legs in a conventional PLWR.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
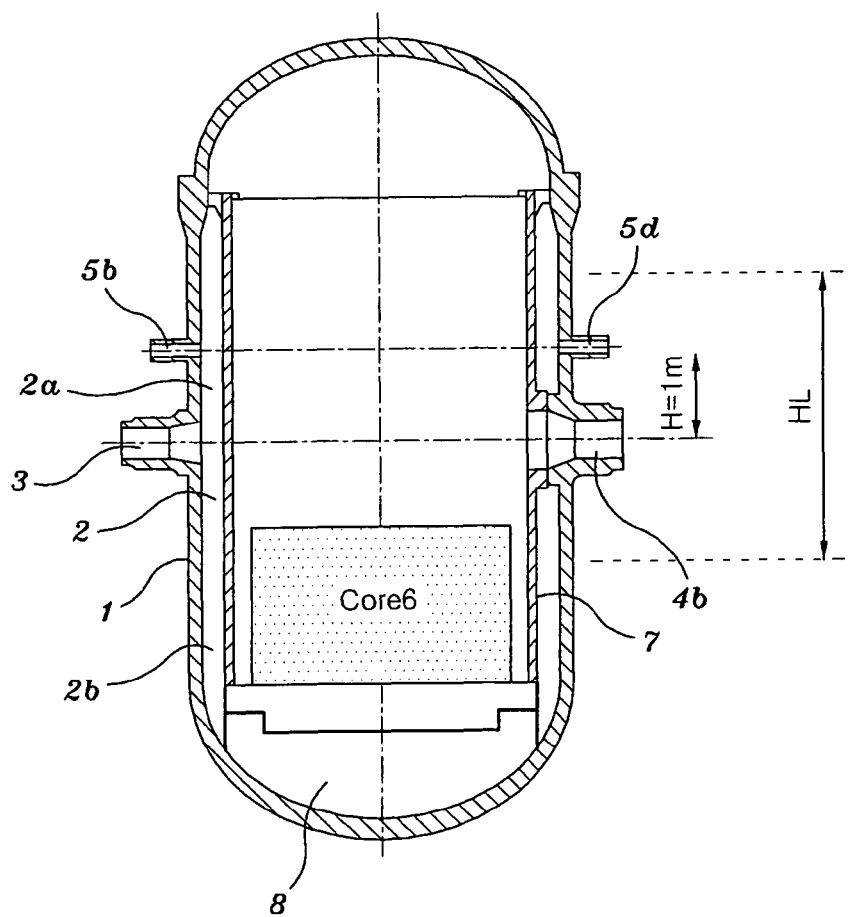
FIG. 3 is a longitudinal sectional view of a reactor vessel of a PLWR according to an embodiment of the present invention.
Figure 4:
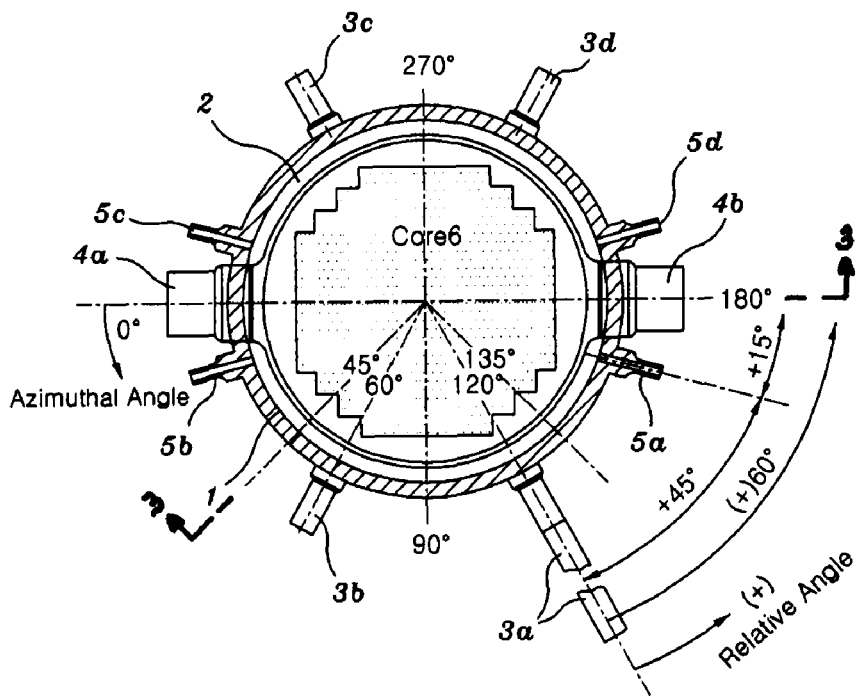
FIG. 4 is a latitudinal sectional view of the reactor vessel of FIG. 3.

As shown in FIGS. 3 and 4, the reactor vessel 1 having direct vessel injection (DVI) nozzles 5 for minimum ECC bypass according to the present invention is used in a pressurized light water reactor (PLWR) and comprises cold legs 3, hot legs 4, DVI nozzles 5, a reactor core 6 and a core support 7.

The reactor vessel 1 of the PLWR has a reactor coolant system in which a coolant flows into the reactor vessel 1 through the cold legs 3 and passes through the reactor core 6 prior to being discharged to the outside of the reactor vessel 1 through the hot legs 4. The DVI nozzles 5 are provided on the reactor vessel 1 to directly inject ECC into the vessel 1. In a detailed description, the DVI nozzles 5 are placed on the reactor vessel 1 at positions horizontally offset from the central axes of the hot legs 4 at 10° to 30° angles in opposite directions in a latitudinal sectional view of the reactor vessel 1. Furthermore, the DVI nozzles 5 are located within regions defined above the central axes of the hot legs 4 in vertical directions of the reactor vessel 1 by a distance of 1.5 times [1.5×(D+d)] the sum of a diameter D of each of the hot legs 4 and a diameter d of each of the DVI nozzles 5.

Preferably, the hot legs 4 are placed on the reactor vessel 1 at two positions diametrically opposite to each other. The cold legs 3 are placed on the reactor vessel 1 at positions which are leveled with the positions of the hot legs 4 and are horizontally spaced apart from the central axes of the hot legs 4 at 60° angles in opposite directions. Thus, the reactor vessel 1 has two hot legs 4 and four cold legs 3.

Preferably, four DVI nozzles 5 are placed on the reactor vessel 1 at positions horizontally offset from the central axes of the hot legs 4 at 15° angles in opposite directions and involved within regions defined between distances of 1 meter and 2 meters above the central axes of the hot legs 4 of the reactor vessel 1.

Embodiments

The present invention will be described in more detail with reference to the accompanying drawings.

FIGS. 3 and 4 illustrate an embodiment of the present invention. FIG. 3 shows the reactor vessel 1 having the DVI nozzles 5 for minimum ECC bypass according to the embodiment of the present invention. FIG. 4 is a latitudinal sectional view of the reactor vessel 1 of FIG. 3. In FIG. 3, the heights of the DVI nozzles 5 above the cold legs 3 and the hot legs 4 are illustrated. That is, the vertical positions of the DVI nozzles 5 on the reactor vessel 1 relative to the cold legs 3 and the hot legs 4 are shown in FIG. 3, while the horizontal positions of the DVI nozzles 5 on the reactor vessel 1 relative to the hot legs 4 are shown in FIG. 4. In a brief description, the DVI nozzles 5 of the present invention are far from the cold legs 3 and are close to the hot legs 4, unlike the conventional DVI nozzles.

The cold legs 3 and the hot legs 4, through which the coolant flows, are provided on the reactor vessel 1 which has the reactor core 6 therein to generate thermal energy. A core support 7 is placed in the reactor vessel 1 to support the reactor core 6 in the reactor vessel 1, with a downcomer 2 defined between the reactor vessel 1 and the core support 7. The reactor coolant is introduced into the vessel 1 through the cold legs 3 and passes downwards through the downcomer 2 to reach a lower chamber 8 of the vessel 1, and flows to the core 6 to absorb thermal energy from the core 6. Thus, the coolant is heated while passing through the core 6 and, thereafter, flows to the hot legs 4 to be supplied to a steam generator (not shown) which generates steam. The steam is supplied to a turbine (not shown), thus rotating the turbine and generating electricity.

In the reactor vessel 1 having a cylindrical shape, the cold legs 3 and the hot legs 4 are placed at positions higher than the core 6 so that the core 6 is always in contact with the coolant. Thus, the core 6 is prevented from quickly overheating during a cold leg break (CLB).

In the reactor vessel 1 having the above-mentioned construction, the cold legs 3, the hot legs 4 and the DVI nozzles 5 to inject ECC into the vessel 1 are configured as follows. The hot legs 4 are placed on the cylindrical reactor vessel 1 at two positions diametrically opposite to each other. The cold legs 3 are placed on the reactor vessel 1 at positions leveled with the hot legs 4 and horizontally spaced apart from the central axes of the hot legs 4 at 60° relative angles in opposite directions. Thus, the reactor vessel 1 has two hot legs 4 and four cold legs 3. On the reactor vessel 1, the two hot legs 4 are horizontally spaced apart from each other at 180° angle. In the present invention, three or four hot legs may be provided on the reactor vessel 1. However, it is preferred to set the number of the hot legs 4 to two. The nuclear reactor having two hot legs is so-called "2-Loop reactor", while the nuclear reactor having three hot legs is so-called "3-Loop reactor". In the 3-Loop reactor, the three hot legs are horizontally spaced apart from each other at 120° angles, while three cold legs are provided on the reactor vessel so that the cold legs are horizontally spaced apart from the three hot legs at 60° angles. Thus, the 3-Loop reactor has three hot legs and three cold legs.

In the preferred embodiment of the present invention, the DVI nozzles 5 are adapted to a 2-Loop PLWR. In the 2-Loop PLWR, the DVI nozzles 5 to inject ECC into the reactor vessel 1 to protect the reactor core 6 during a break of a cold leg 3 are placed on the reactor vessel 1 at positions horizontally offset from the central axes of the hot legs 4 at 10° to 30° relative angles, preferably, 15° angles, in opposite directions. The DVI nozzles 5 placed at the above-mentioned positions are horizontally offset from the central axes of the cold legs 3 at 30° to 50° relative angles, preferably, 45° angles. Thus, the DVI nozzles 5 are closer to the hot legs 4 than the cold legs 3, particularly, than the broken cold leg 3, so that the relative angle between the broken cold leg 3 and one DVI nozzle 5 closer to the broken cold leg 3 increases.

As shown in FIG. 4, two hot legs 4a and 4b are placed on the reactor vessel 1 at two positions diametrically opposite to each other. Four cold legs 3a, 3b, 3c and 3d are placed on the reactor vessel 1 at positions horizontally spaced apart from the central axes of the hot legs 4a and 4b at 60° angles in opposite directions. Four DVI nozzles 5a, 5b, 5c and 5d are placed on the vessel 1 at positions horizontally offset from the cold legs 3a, 3b, 3c and 3d and the hot legs 4a and 4b. A cold leg break (CLB) and an injection of ECC into the reactor vessel 1 through the DVI nozzles 5 to protect the core 6 against the CLB will be described herein below while assuming that the first cold leg 3a is broken. When the first cold leg 3a is broken, the reactor coolant leaks from the reactor vessel 1 to the outside through the broken cold leg 3a, resulting in a rapid reduction in pressure of the reactor coolant system of the PLWR to 0.5 MPa or less. To supplement the coolant deficiency caused by the coolant leakage from the reactor vessel 1 in the event of the CLB, ECC is injected into the reactor vessel 1 through the four DVI nozzles 5a, 5b, 5c and 5d. In that case, a large part of ECC, which is injected into the vessel 1 through the first DVI nozzle 5a closer to the broken cold leg 3a, is swept into the broken cold leg 3a due to the suction force generated in the broken cold leg 3a and strongly acting on the first DVI nozzle 5a. In the related art, the sweep-out of ECC into the broken cold leg 102 during a cold leg break (CLB) is so-called "direct ECC bypass", and the ratio of the amount of bypassed ECC to the amount of injected ECC is so-called "direct ECC bypass fraction". The ECC, which is swept into the broken cold leg 3a, does not contribute to the cooling of the reactor core 6. However, the suction force generated in the broken cold leg 3a does not strongly act on the third DVI nozzle 5c closer to the third cold leg 3c which is placed opposite to the broken cold leg 3a. Thus, ECC, which is injected into the vessel 1 through the third DVI nozzle 5c, flows downwards from the upper portion 2a to the lower portion 2b of the downcomer 2 and passes through the lower chamber 8 of the reactor vessel 1 to contribute to the cooling of the reactor core 6. During the break of the first cold leg 3a, the total direct ECC bypass fraction in the reactor vessel 1 having the four DVI nozzles 5a, 5b, 5c and 5d is determined by the direct ECC bypass fraction of the DVI nozzle 5a which is located at a predetermined angle relative to the broken cold leg 3a.

Figure 5A:
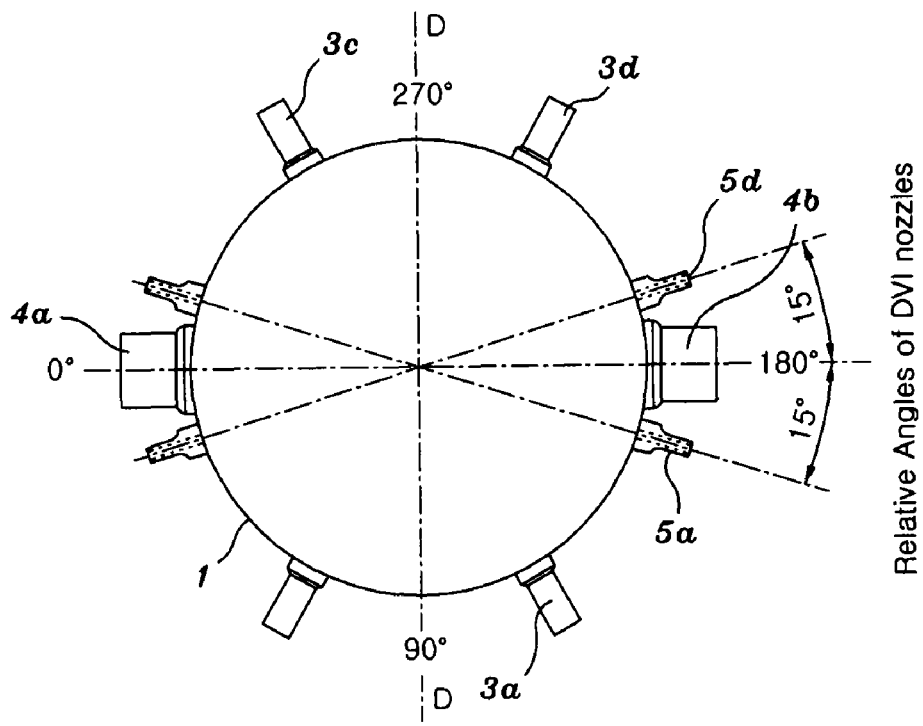
FIG. 5a is a latitudinal sectional view of the reactor vessel of FIG. 4 to schematically show the angular positions of the DVI nozzles relative to the hot legs on the reactor vessel.
Figure 5B:
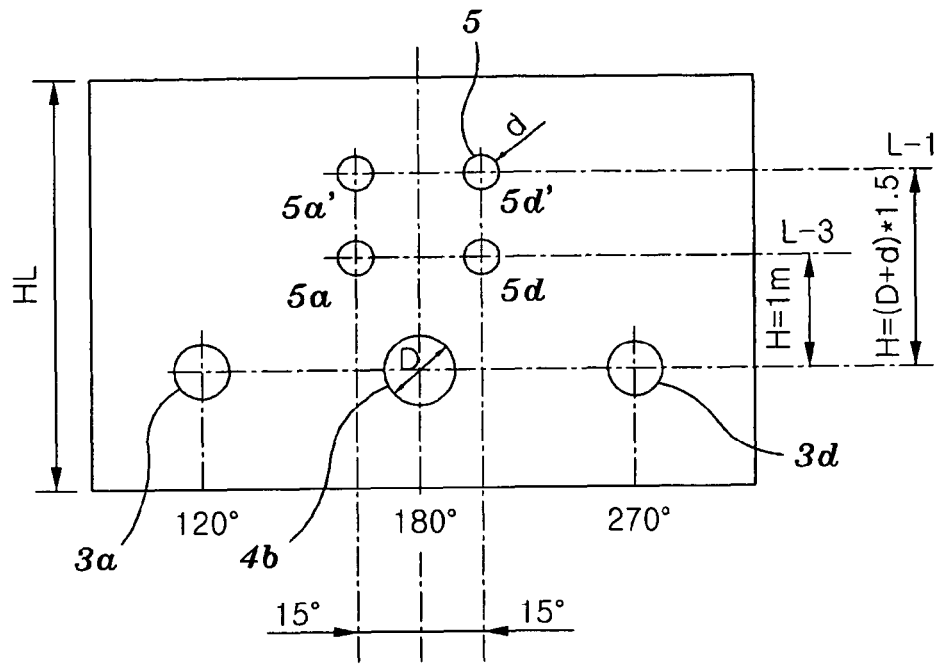
Figure 6:
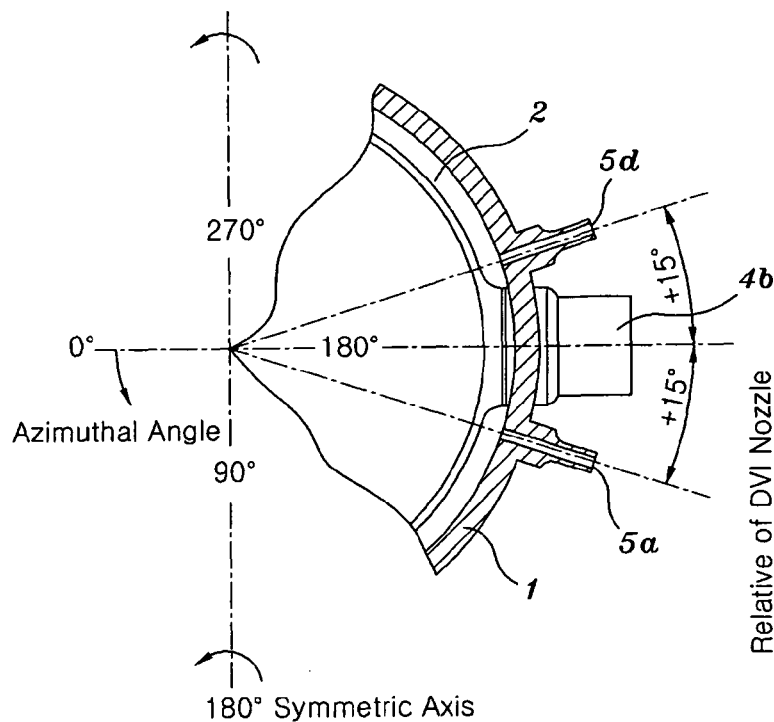
FIG. 6 is an enlarged sectional view of a part of the reactor vessel of FIG. 5a, which involves one hot leg and two DVI nozzles.

FIGS. 5a, 5b and 6 illustrate the angles and heights of the DVI nozzles relative to the hot legs on the reactor vessel according to the present invention. FIG. 5a is a latitudinal sectional view of the reactor vessel 1 to show the angles of the DVI nozzles 5a, 5b, 5c and 5d relative to the hot legs 4a and 4b. FIG. 5b is a 180° symmetry development view of the region HL×DD of the reactor vessel 1 of FIG. 5a on which two cold legs, one hot leg and two DVI nozzles are located. FIG. 6 is an enlarged sectional view of a part of the reactor vessel of FIG. 5a to show the angular intervals of the DVI nozzles 5a and 5d relative to the hot leg 4b.

As shown in FIG. 5a, two DVI nozzles 5a and 5b are placed on the reactor vessel 1 at positions horizontally offset from the central axis of the hot leg 4b at 15° angles in opposite directions. As shown in FIG. 5b, two DVI nozzles 5a' and 5b' are located at a height L-1 defined above the central axis of the hot leg 4b in a vertical direction of the reactor vessel 1 by a distance of 2 times a diameter D of the hot leg 4b, preferably, by a distance of 1.5 times [1.5×(D+d)] the sum of the diameter D of the hot leg 4b and a diameter d of the DVI nozzle 5a'. FIG. 5b also shows that two DVI nozzles 5a and 5b are located at another height L-3 defined above the central axis of the hot leg 4b in a vertical direction of the reactor vessel 1 by a distance of the diameter D of the hot leg 4b. In the present invention, the height L-1 is preferably set to 2 meters, while the height L-3 is preferably set to 1 meter.

In the first embodiment, the distance from the central axis of the hot leg 4b to the DVI nozzle 5a is determined, based on the regulations of ASME (American Society of Mechanical Engineers) stated "two nozzles must be located such that the axes of the two nozzles are spaced apart from each other by a distance of at least 1.5 times the sum of diameters of the two nozzles, otherwise a reinforcing material must be provided". Thus, in the first embodiment, the height of the DVI nozzle 5a above the central axis of the hot leg 4b is determined by the distance of 1.5 times [1.5×(D+d)] the sum of the diameter D of the hot leg 4b and the diameter d of the DVI nozzle 5a.

In the second embodiment, the height of the DVI nozzle 5a above the central axis of the hot leg 4b is determined, based on the regulations of KSPN (Korean Standard Nuclear Plant) and APR1400 (Advanced Pressurized reactor 1400) stated "in 2-Loop PLWR of 2800 MWt to 4000 MWt thermal power of core, the inner diameter of hot legs is set to 42 inches and the inner diameter of cold legs is set to 30 inches according to standard of pipe design". Thus, in the second embodiment, the height of the DVI nozzle 5a above the central axis of the hot leg 4b is involved between 1 meter and 2 meters.

The angles and heights of the DVI nozzles 5c and 5d relative to the hot leg 4a are determined in the same manner as that described for the determination of the angles and heights of the DVI nozzles 5a and 5b relative to the hot leg 4b.

The DVI nozzles 5 are placed on the reactor vessel 1 at positions horizontally offset from the central axes of the hot legs 4a and 4b at 10° to 30° angles, preferably, 15° angles, in opposite directions. Furthermore, the DVI nozzles 5 may be located at the height L-3 in the same manner as that described for the DVI nozzles 5a, 5b, 5c and 5d or may be located at the height L-1 in the same manner as that described for the DVI nozzles 5a', 5b', 5c' and 5d'. In the present invention, the height L-1 above the central axis of each of the hot legs 4a and 4b may be defined by a distance of 2 times (2×D) the diameter D of each of the hot legs 4a and 4b or a distance of 1.5 times [1.5×(D+d)] the sum of the diameter D of each of the hot legs 4a and 4b and the diameter d of each of the DVI nozzles 5, or may be set to 2 meters. The height L-3 may be defined by a distance of the diameter D of each of the hot legs 4a and 4b, or may be set to 1 meter.

In the present invention, when the diameter D of the hot legs 4 is set to 42" and the diameter d of the DVI nozzles 5 is set to 8.5", the height L-1, which is defined by the distance of 1.5 times [1.5×(D+d)] the sum of the diameter D of each hot leg 4 and the diameter d of each DVI nozzle 5, is 1.92 meters. According to similarity tests, the direct ECC bypass fractions of the DVI nozzles 5a, 5b, 5c and 5d located at the height L-3 are lower than those of the DVI nozzles 5a', 5b', 5c' and 5d' located at the height L-1. However, the direct ECC bypass fractions of the DVI nozzles 5a', 5b', 5c' and 5d' located at the height L-1 are remarkably lower than those of conventional DVI nozzles placed closer to the cold legs so that the height L-1 of the DVI nozzles 5a', 5b', 5c' and 5d' above the hot leg 4b is preferably adopted. Thus, the DVI nozzles 5 of the present invention may be selectively located at the different heights L-1 and L-3 which have the same azimuthal angles and the same angles relative to the hot legs 4.

Figure 7A:
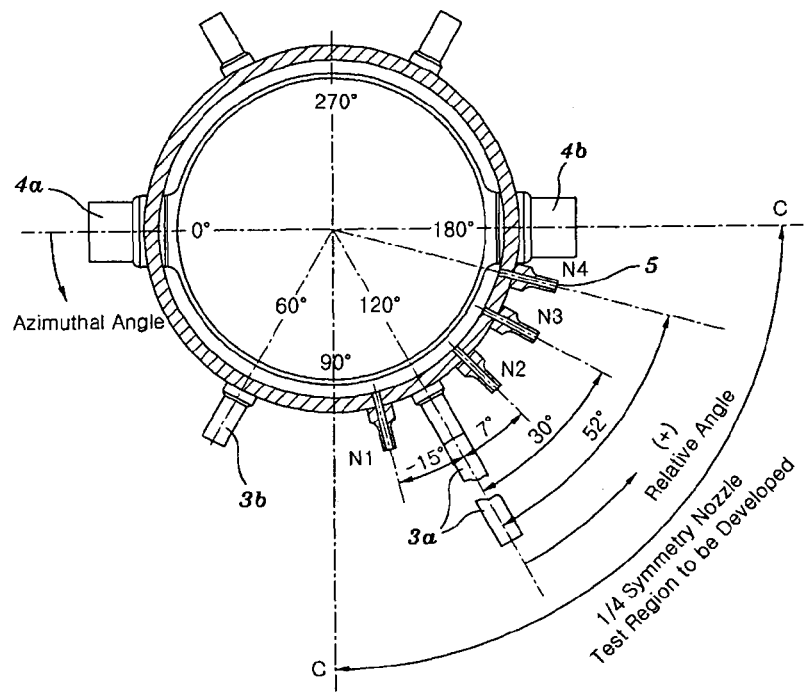
FIG. 7a is a latitudinal sectional view of a reactor vessel of a ⅕-scale experimental facility for similarity tests according to the present invention.
Figure 7B:
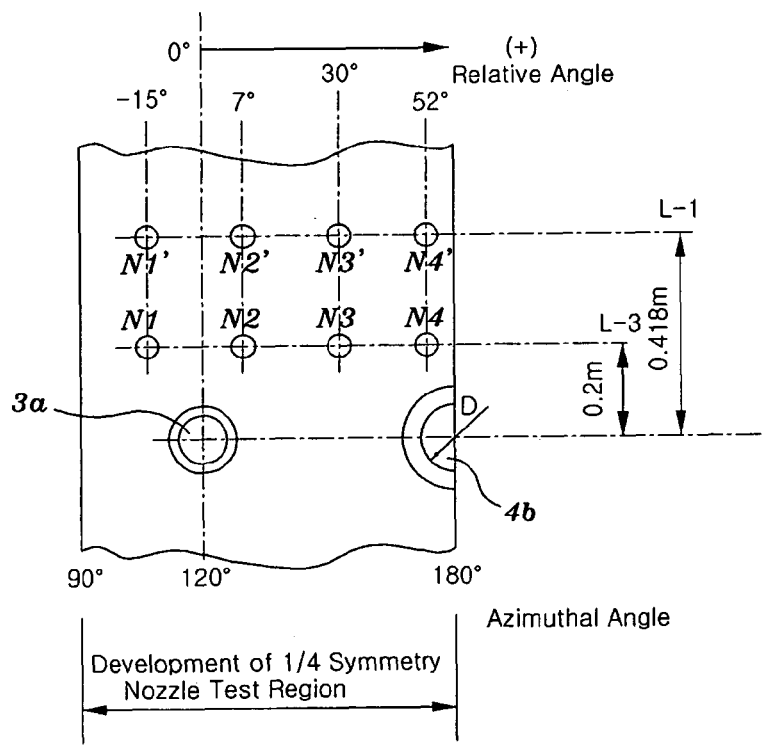
Figure 8A:
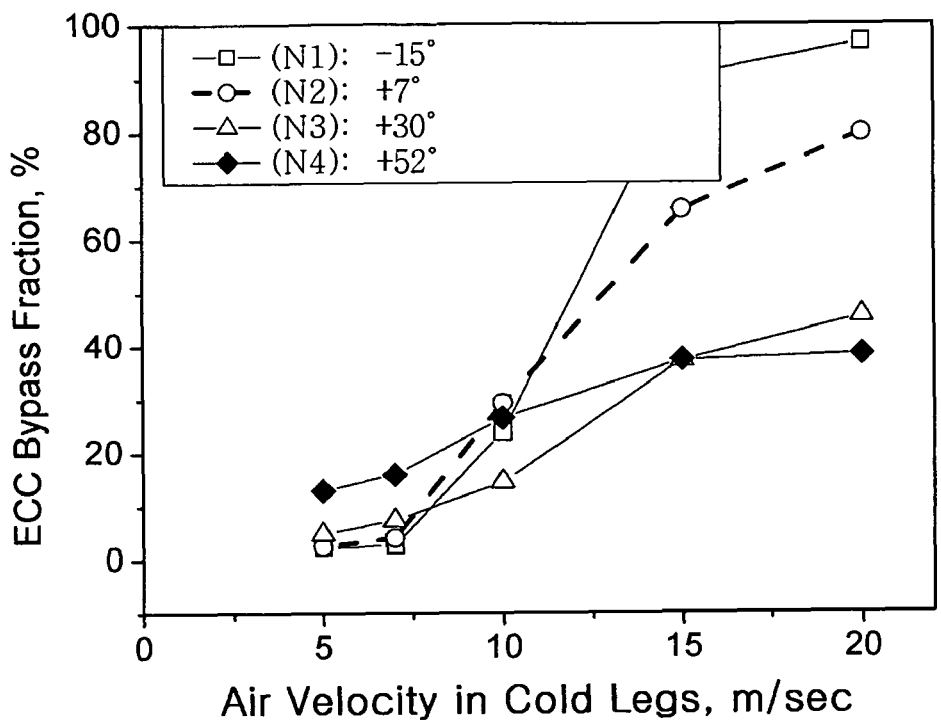
FIG. 8a is a graph comparatively showing the variations in the direct ECC bypass fractions according to different relative angles of DVI nozzles located at the height L-1 of FIG. 7b during the similarity tests using the ⅕-scale experimental facility.
Figure 8B:
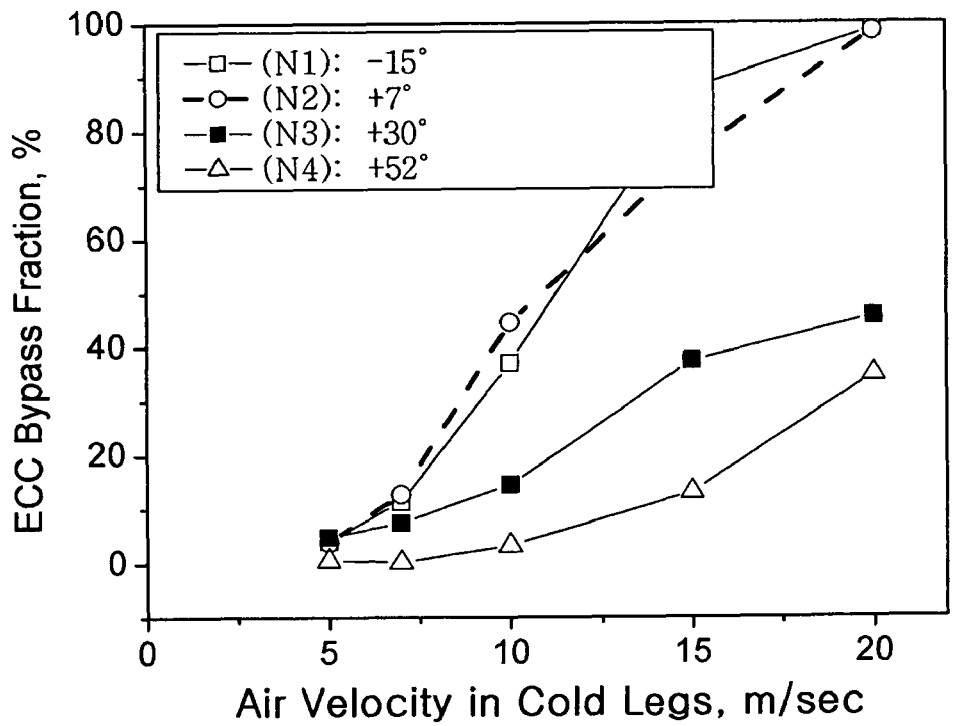
FIG. 8b is a graph comparatively showing the variations in the direct ECC bypass fractions according to different relative angles of DVI nozzles located at the height L-3 of FIG. 7b during the similarity tests using the ⅕-scale experimental facility.

FIGS. 7a to 8b show a reactor vessel of a 1/5-scale experimental facility, and results of similarity tests executed using the experimental facility in which airflow is adopted in similitude of steam flow according to the law of fluid similarity. FIG. 7a is a latitudinal sectional view of the reactor vessel of the 1/5-scale experimental facility for similarity tests according to the present invention. FIG. 7b is a 1/4 symmetry development view of the region C-C of the reactor vessel of FIG. 7a, which shows the hot leg 4b, the broken cold leg 3a and the DVI nozzles 5. FIG. 8a is a graph comparatively showing the variations in the direct ECC bypass fractions according to different relative angles of the DVI nozzles located at the height L-1 of FIG. 7b during the similarity tests using the 1/5-scale experimental facility. FIG. 8b is a graph comparatively showing the variations in the direct ECC bypass fractions according to different relative angles of the DVI nozzles located at the height L-3 of FIG. 7b during the similarity tests using the 1/5-scale experimental facility. A further 1/5-scale experimental facility was used in the similarity test for a DVI nozzle N2' located at the height L-1 to be horizontally offset from the broken cold leg 3a at a relative angle of 7°. A still further shows the 1/5-scale experimental facility was used in the similarity test for another DVI nozzle N4' located at the height L-1 to be horizontally offset from the broken cold leg 3a at a relative angle of 52°.

On the 1/5-scale experimental facility used in the similarity tests according to the present invention, the DVI nozzles N1 and N1' are placed at positions horizontally offset from the broken cold leg 3a at a relative angle of −15° as shown in FIGS. 7a and 7b. The DVI nozzles N2 and N2' are placed on the vessel of the experimental facility at positions horizontally offset from the broken cold leg 3a at a relative angle of 7°. The DVI nozzles N3 and N3' are placed on the vessel of the experimental facility at positions horizontally offset from the broken cold leg 3a at a relative angle of 30°. Furthermore, the DVI nozzles N4 and N4' are placed on the vessel of the experimental facility at positions horizontally offset from the broken cold leg 3a at a relative angle of 52°. The height L-1 of the DVI nozzles N1', N2', N3' and N4' above the central axis of the broken cold leg 3a (leveled with the central axis of the hot leg 4b) is set to 0.418 meter (scaled-up to 2.09 meters in a real reactor vessel 1). The height L-3 of the DVI nozzles N1, N2, N3 and N4 above the central axis of the broken cold leg 3a (leveled with the central axis of the hot leg 4b) is set to 0.2 meter (scaled-up to 1 meter in the real reactor vessel 1).

The similarity tests using the 1/5-scale experimental facility of the present invention are executed while varying the heights and angles of the DVI nozzles 5 relative to the broken cold leg 3a and changing the flow velocity of air, injected into the cold legs 3, by 5 m/sec within a range from 5 m/sec to 20 m/sec. In that case, the similitude fluid air velocity in the cold legs 3 is about 18 m/sec. In the event of a break of the cold leg 3a of the reactor vessel 1 having the DVI nozzles 5a, 5b, 5c and 5d, the total direct ECC bypass fraction caused by the sweep-out of ECC into the broken cold leg 3a is determined by the direct ECC bypass fraction of the DVI nozzle 5a which is located closer to the broken cold leg 3a. Thus, in the similarity tests of the present invention, the sweep-out of fluid from the DVI nozzle 5a into the broken cold leg 3a is tested.

In the event of a break of a cold leg 3a provided on the reactor vessel 1 of a PLWR which is configured such that the pressure in the vessel 1 must be maintained at a minimum level higher than a predetermined reference point, the reactor coolant leaks from the vessel 1 in the form of steam due to a reduction in the pressure of the vessel 1. Thus, in the similarity tests, air is injected into the vessel of the experimental facility through the cold legs 3. Furthermore, in the similarity tests, ECC in the liquid phase to cool the core 6 is injected into the vessel through the DVI nozzles at an injection speed 0.89 m/sec. The above-mentioned ECC injection speed 0.89 m/sec is scaled-down at a 1/SQRT(5) ratio of 2 m/sec which is the ECC injection speed in an ECCS (Emergency Core Cooling System) during an LBLOCA (Large Break Loss of Coolant Accident) reflood phase in a real power plant. That is, 2 m/sec×1/SQRT(5)=0.89 m/sec. Furthermore, the maximum flow air velocity of 20 m/sec through the cold legs 3 is scaled-down at a ratio of 44.7 m/sec which is the maximum steam velocity in a broken cold leg during the LBLOCA reflood phase in the real power plant. According to a transient analysis using a computer code, the steam velocity in the real power plant is about 40 m/sec.

The results of the similarity tests executed using the 1/5-scale experimental facility of the present invention are shown in the graphs of FIGS. 8a and 8b. As shown in the graph of FIG. 8a showing the similarity test results for the DVI nozzles located at the height L-1, ECC injected into the vessel through the DVI nozzles N1' and N2' located at positions horizontally offset from the broken cold leg 3a at relative angles of −15° and 7° in the same manner as those of conventional reactors is swept into the broken cold leg 3a at direct ECC bypass fractions higher than 80% and 60% when the velocity of air in the cold legs is higher than 15 m/sec. However, the direct ECC bypass fractions of the DVI nozzles N3' and N4' located at positions of relative angles of 30° and 52° according to the present invention are remarkably reduced lower than 40%.

Furthermore, as shown in the graph of FIG. 8b showing the similarity test results for the DVI nozzles located at the height L-3, the direct ECC bypass fractions of the DVI nozzles N1 and N2 located at positions of relative angles of −15° and 7° in the conventional manner are higher than 80% when the velocity of air in the cold legs is higher than 15 m/sec. Particularly, the direct ECC bypass fractions of the DVI nozzles N1 and N2 reach around 100% when the velocity of air in the cold legs is about 20 m/sec. However, the direct ECC bypass fractions of the DVI nozzles N3 and N4 located at positions of relative angles of 30° and 52° according to the present invention are remarkably reduced lower than 40%. The similitude fluid velocity in the broken cold leg during a cold leg break in a real power plant is about 18 m/sec.

As apparent from the above description, the present invention provides a DVI nozzle for minimum ECC bypass. The DVI nozzle of the present invention efficiently injects ECC into a reactor vessel of a PLWR to cool the reactor core during a cold leg break (CLB) that may occur in the reactor coolant system of the PLWR. Thus, the DVI nozzle remarkably reduces the direct ECC bypass fraction to a broken cold leg and minimizes the amount of direct ECC bypass without requiring installation of additional elements, and thereby prevents safety accidents of reactor.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pressurized light water reactor (PLWR) having direct vessel injection (DVI) nozzles for reducing emergency core coolant (ECC) bypass through a broken cold leg comprising:
    a cylindrical reactor vessel having a central axis;
    a core support located within the reactor vessel to support a reactor core in the reactor vessel;
    a first hot leg (4a) and a second hot leg (4b) located on the cylindrical reactor vessel at two diametrically opposed positions along an axis and at a first height positioned above the reactor core;
    a first cold leg (3a), a second cold leg (3b), a third cold leg (3c) and a fourth cold leg (3d) located on the cylindrical reactor vessel each at said first height above the reactor core;
    the second cold leg (3b) and the third cold leg (3c) are located on opposite sides of the first hot leg (4a) and spaced from the first hot leg at an angle of 60°, and the first cold leg (3a) and the fourth cold leg (3d) are located on opposite sides of the second hot leg (4b), and spaced from the second hot leg at an angle of 60°;
    a first DVI nozzle (5a), a second DVI nozzle (5b), a third DVI nozzle (5c) and a fourth DVI nozzle (5d) located on the cylindrical reactor vessel wherein the first DVI nozzle (5a) and the fourth DVI nozzle (5d) are located at a distance above the axis of the first and second hot legs where said distance equals 1.5 times a sum of a diameter of the second hot leg and a diameter of the first DVI nozzle; and
    the first DVI nozzle (5a) is located between the second hot leg (4b) and the first cold leg (3a), and closer to the second hot leg than to the first cold leg at a first angle from the second hot leg of 10 degrees up to and including 15 degrees, the fourth DVI nozzle (5d) is located between the second hot leg (4b) and the fourth cold leg (3d), and closer to the second hot leg than to the fourth cold leg at a second angle from the second hot leg of 10 degrees up to and including 15 degrees, the second DVI nozzle (5b) is located between the first hot leg (4a) and the second cold leg (3b), and closer to the first hot leg than to the second cold leg at a third angle from the second hot leg of 10 degrees up to and including 15 degrees, the third DVI nozzle (5c) is located between the first hot leg (4a) and the third cold leg (3c), and closer to the first hot leg than to the third cold leg at a fourth angle from the first hot leg of 10 degrees up to and including 15 degrees.

2. The pressurized light water reactor (PLWR) according to claim 1, wherein each of the first angle, the second angle, the third angle and the fourth angle are 15°.

* * * * *